(12) United States Patent
Beste et al.

(10) Patent No.: US 7,038,455 B2
(45) Date of Patent: May 2, 2006

(54) ELECTROMAGNETIC WAVE RESISTIVITY TOOL

(75) Inventors: Randal T. Beste, Houston, TX (US); Christopher A. Golla, Kingwood, TX (US); Michael Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 121 days.

(21) Appl. No.: 10/634,585

(22) Filed: Aug. 5, 2003

(65) Prior Publication Data
US 2005/0030035 A1  Feb. 10, 2005

(51) Int. Cl.
*G01V 3/18* (2006.01)

(52) U.S. Cl. .......................... 324/333; 324/338; 702/6; 702/7; 73/152.01

(58) Field of Classification Search ........ 324/338–339, 324/348, 351, 354–357, 366, 368–369, 371
See application file for complete search history.

(56) References Cited

U.S. PATENT DOCUMENTS

| 4,949,045 | A | 8/1990 | Clark et al. |
| 5,530,358 | A | 6/1996 | Wisler et al. |
| 5,661,401 | A | 8/1997 | Ishikawa et al. |
| 6,218,842 | B1 | 4/2001 | Bittar et al. |
| 6,268,726 | B1 * | 7/2001 | Prammer et al. ........... 324/303 |
| 6,294,917 | B1 * | 9/2001 | Nichols ...................... 324/339 |
| 6,577,129 | B1 | 6/2003 | Thompson et al. |
| 6,646,441 | B1 * | 11/2003 | Thompson et al. ......... 324/338 |
| 2004/0217763 | A1 * | 11/2004 | Moore ........................ 324/338 |

OTHER PUBLICATIONS

Teledyne Relays, High Temperature (200 degree C) To-5 Relay DPDT; Series 412H, 422H, 432H; 1996 (pp. 65-67).

* cited by examiner

*Primary Examiner*—Bot LeDynh
(74) *Attorney, Agent, or Firm*—Mark E. Scott; Conley Rose, PC

(57) ABSTRACT

A method and system of operating an electromagnetic resistivity tool wherein at least one transmitting antenna of the tool is selectively operable at three or more resonant frequencies for better resistivity profiling of a formation.

17 Claims, 3 Drawing Sheets

ELECTROMAGNETIC WAVE RESISTIVITY TOOL

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are directed to logging-while-drilling (LWD) electromagnetic wave tools. More particularly, embodiments of the invention are directed to multiple frequency LWD resistivity tools. More particularly still, embodiments of the invention are directed to LWD resistivity tools where at least one of the transmitting antennas may operate at three or more frequencies.

2. Background of the Invention

Wireline logging tools may be used to gather information regarding downhole formations. One such wireline logging tool is an induction resistivity tool for determining resistivity of the downhole formation. Resistivity may be determined at multiple depths of investigation, where the depth of investigation in a wireline tool operating at a low frequency (e.g., near 20 kilo-Hertz) is a function of the spacing between each transmitter and receiver or receiver pair. To obtain multiple depths of investigation in a wireline tool, multiple transmitters may be mounted on the tool at spaced-apart locations from the receivers.

As technology has advanced in the exploration and recovery of hydrocarbons, it is now common to include an LWD tool capable of performing resistivity measurements as part of the bottomhole assembly (BHA) of a drillstring. LWD resistivity tools may have many similarities with their wireline counterparts, which may comprise multiple transmitters spaced apart from a receiver pair, use of electromagnetic wave propagation as an interrogating signal, and creation of logs of resistivity. However, the frequency of operation of an LWD tool may be different than that of a wireline tool. For example, many LWD tools may operate at a frequency of 2 mega-Hertz. It has been discovered in the related art that the depth of investigation of an LWD resistivity tool may also be a function of the frequency of the interrogating electromagnetic wave, when higher frequencies are used. Thus, a wireline tool and an LWD tool having the same spacing between the transmitters and receivers, because of differences in frequency, may have different depths of investigation. Some LWD tools may selectively use different frequencies to adjust the depths of investigation.

While some related art devices may dedicate a single antenna for use with each particular frequency, some related art devices may use a single antenna to transmit up to two frequencies. FIG. 1 illustrates an electrical schematic for a transmitting antenna operable or resonant at two frequencies. In particular, FIG. 1 illustrates a loop antenna 10 coupled to capacitors 12 and 14, as well as an LC circuit 16. The LC circuit 16 may be tuned such that at a first operational frequency, the LC circuit acts as a high impedance. In this situation, the inductance of the antenna 10 may interact only with the capacitance of capacitor 12, thus operating at a first resonant frequency. At a second frequency of operation, the LC circuit 16 may have a very low impedance. In this situation, the inductance of the antenna 10 may interact with the capacitance of capacitors 12 and 14, and also the capacitance of the LC circuit 16, thus operating at a second resonant frequency.

LWD tools may draw power from batteries within the tool. LWD tool designers strive to minimize power consumption so as to extend battery life. Every component in an electronic circuit, such as LC circuit 16, consumes power. Thus, LWD tool designers try to avoid use of additional circuits which consume battery power of the tool. Moreover, the space within which to run wires and place circuits in a downhole tool is limited. These factors militate against an LWD tool designer increasing functionality of transmitting antennas by adding circuits and power consuming components.

BRIEF SUMMARY OF SOME OF THE PREFERRED EMBODIMENTS

The problems noted above are solved in large part by a method and related system of an electromagnetic wave resistivity tool. One exemplary embodiment is a method that comprises operating a logging tool in a borehole (the logging tool having a transmitting antenna), transmitting from the transmitting antenna an electromagnetic wave having a first frequency, transmitting an electromagnetic wave having a second frequency, and transmitting an electromagnetic wave having a third frequency.

Another exemplary aspect may be a logging tool comprising a tool body adapted for use in a borehole, a receiving antenna disposed on a tool body, and a transmitting antenna disposed on the tool body at a spaced-apart location from the receiving antenna. The transmitting antenna may be selected with operable at three or more resonant frequencies for transmitting electromagnetic waves or electromagnetic radiation.

Yet another alternative embodiment may be a bottomhole assembly comprising a drill bit, a mud motor operatively coupled to the drill bit, and a logging tool coupled to the mud motor. The logging tool may comprise a tool body, a plurality of receiving antennas disposed on a tool body, and a plurality of transmitting antennas disposed on the tool body at spaced-apart locations from each other and the receiving antennas. Each transmitting antenna may be selectively operable at greater than two resonant frequencies for transmitting electromagnetic waves or electromagnetic radiation.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION OF THE PREFERRED EMBODIMENTS

Figure 1:
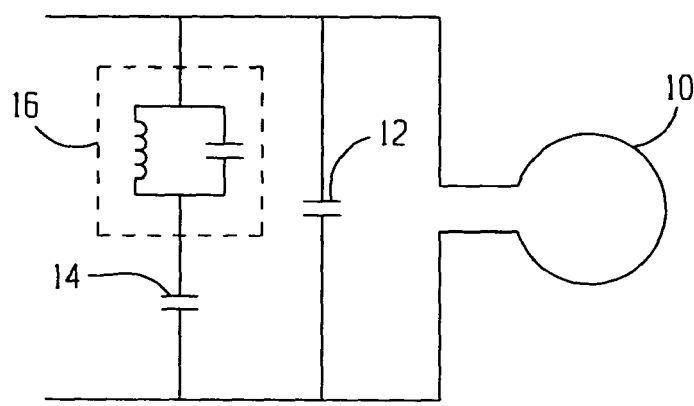
FIG. 1 illustrates a related art circuit for tuning a transmitting antenna.
Figure 2:
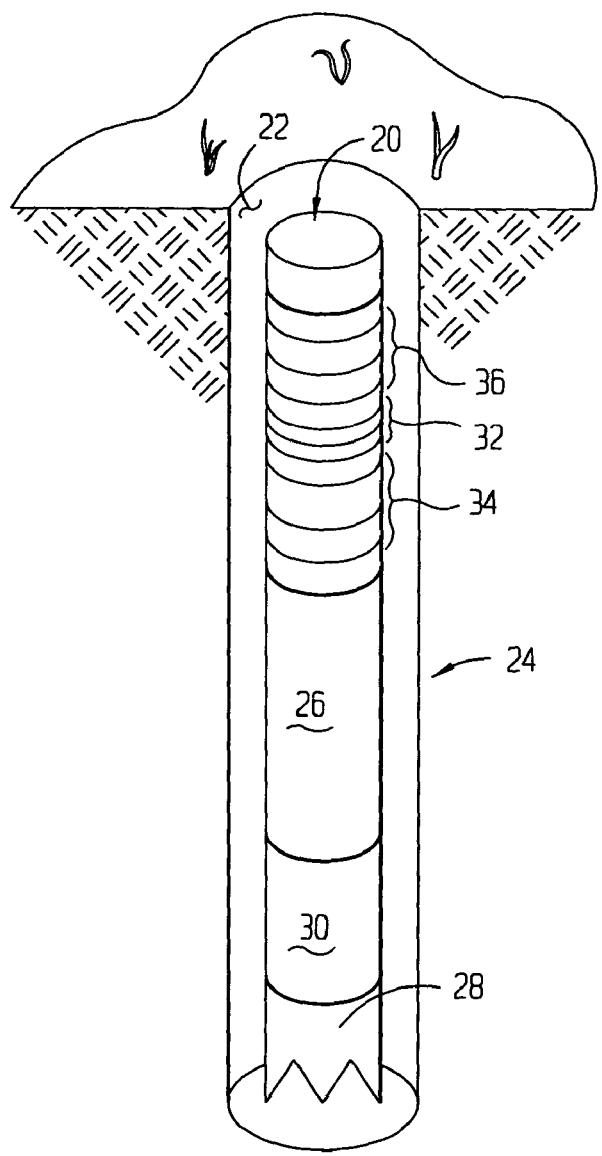
FIG. 2 illustrates a logging tool disposed within a borehole in accordance with embodiments of the invention.

FIG. 2 illustrates a cross-sectional elevational view of a logging tool 20 disposed within a borehole 22. In accordance with at least some embodiments of the invention, the logging tool 20 may be part of a bottomhole assembly (BHA) 24 of a drill string; however, the systems and methods described herein are equally applicable to wireline devices. In addition to the bottomhole assembly 24 having the logging tool 20, the BHA 24 may also comprise one or more additional logging-while-drilling (LWD) or measuring-while-drilling (MWD) devices 26. The BHA 24 may also comprise a drill bit 28, possibly coupled to a downhole motor 30. As the BHA 24 drills through the surrounding formation, the resistivity tool 20 may take resistivity measurements of the surrounding formation.

A resistivity tool 20 constructed in accordance with embodiments of the invention may make resistivity determinations at multiple depths of investigation. Thus, resistivity tool 20 may comprise a plurality of receiving antennas 32 medially disposed in operational relationship to a plurality of transmitting antennas. In accordance with embodiments of the invention, six transmitting antennas may be used, comprising a group of three transmitting antennas 34 on a first side of the receiving antennas 32, and a group of three transmitting antennas 36 on a second side of the receiving antennas 32. While the preferred embodiments may comprise three receiving antennas and a total of six transmitting antennas, any number of receiving and transmitting antennas may be used. The resistivity tool 20 in accordance with embodiments of the invention controls the depths of investigation at which resistivity measurements are made, at least to some extent, by selectively using transmitters with varying spacing.

Figure 3:
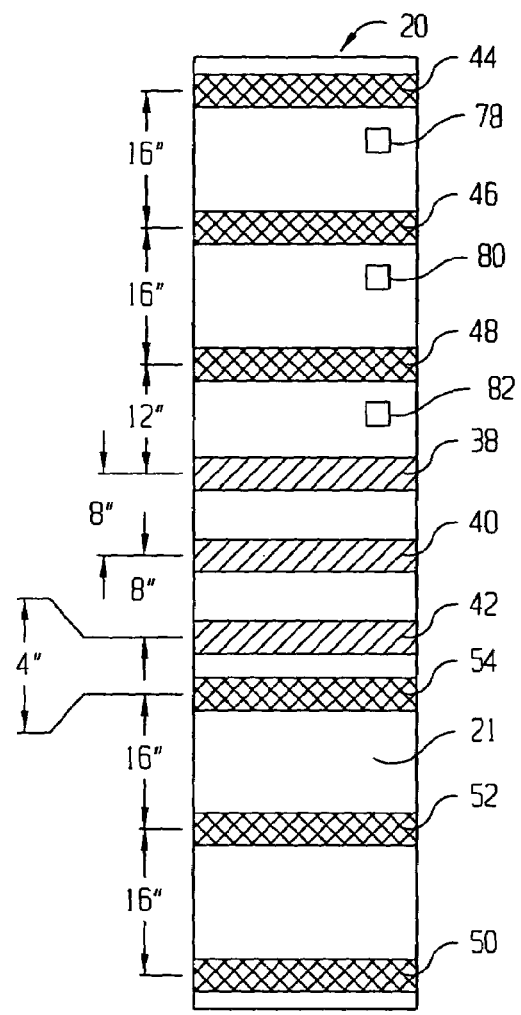
FIG. 3 illustrates an exemplary layout of the transmitting and receiving antennas of an electromagnetic wave resistivity tool in accordance with embodiments of the invention.

FIG. 3 illustrates in greater detail a resistivity tool 20 constructed in accordance with embodiments of the invention. Although one or more receiving antennas may be used, a resistivity tool constructed in accordance with embodiments of the invention may have three receiving antennas 38, 40 and 42. The receiving antennas 38, 40 and 42 may each comprise one or more loops of wire running along the circumference of the tool body 21. In at least some embodiments the spacing between the receiving antennas may be eight inches, although any suitable spacing may be used. Each receiving antenna may couple to a reception circuit (not specifically shown) which, in combination with the receiving antennas, detects electromagnetic waves or electromagnetic radiation. Based on one or both of the amplitude and phase of received electromagnetic signals, the LWD tool 20 may be capable of determining the resistivity of the surrounding formations.

Embodiments of the resistivity tool 20 may also comprise a total of six transmitting antennas, with three of those transmitting antennas 44, 46 and 48 on a first side of the receiving antennas, and three of the transmitting antennas 50, 52, and 54 on a second side of the receiving antennas. In accordance with at least some embodiments of the invention, transmitting antenna 48 may be twelve inches from receiving antenna 38, transmitting antenna 46 may be sixteen inches from transmitting antenna 48, and transmitting antenna 44 may be sixteen inches from transmitting antenna 46. Transmitting antenna 54 may be four inches from the receiving antenna 42, transmitting antenna 52 may be sixteen inches from transmitting antenna 54, and transmitting antenna 50 may be sixteen inches from transmitting antenna 52. While these are the preferred spacings, other spacings may be equivalently used.

In accordance with embodiments of the invention, each of the transmitting antennas may be selectively tuned to transmit electromagnetic signals or waves having one of three or more selected frequencies. Thus, while the depths of investigation of the tool 20 may be controlled to some extent by spacing between the transmitting and receiving antennas, the depths of investigation may also be controlled by selecting an appropriate frequency. In accordance with embodiments of the invention, each transmitting antenna may be tuned to transmit electromagnetic waves having a frequency being one of 2 mega-Hertz, 500 kilo-Hertz or 250 kilo-Hertz. While these three frequencies are preferred, different frequencies, and a greater selection of frequencies, may also be used.

Figure 4:
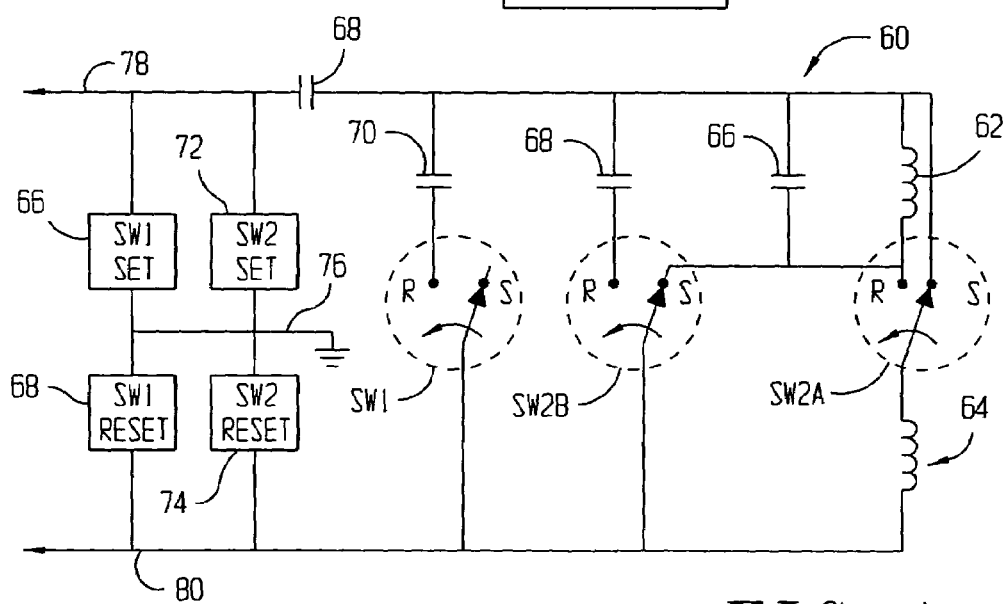
FIG. 4 illustrates an antenna tuning circuit in accordance with embodiments of the invention.

FIG. 4 illustrates an antenna circuit 60 coupled to antenna windings 62, 64 in accordance with embodiments of the invention. As will be discussed more fully below, the antenna windings 62, 64 may be operated in series or in parallel, depending upon the particular tuning desired. The combination of the antenna winding 62, 64 may be any of the transmitting antennas 44, 46, 48, 50, 52 and/or 54. In accordance with embodiments of the invention, each antenna windings 62, 64 comprises four turns of wire disposed around the circumference of the tool body 21. The wire may, in some embodiments, comprise twenty-four gauge magnetic wire with HML insulation, a high temperature magnetic wire, such as may be available from MWS Wire Industries. However, other gauges of wire, and differing number of turns, may be used depending upon the desired inductance of each of the antenna windings (which may be a function of the operating frequencies of the antenna winding). The antenna circuit 60 also may comprise a plurality of relays or switches. In the exemplary embodiment illustrated in FIG. 4, a first switch SW1 may use only a single set of contacts, while a second switch SW2 may use two sets of contacts (labeled SW2A and SW2B). Switches used in accordance with embodiments of the invention may have multiple activation coils. In particular, switch SW1 may have a set coil 66 and a reset coil 68. Likewise, switch SW2 may have a set coil 72 and a reset coil 74. In the illustration of FIG. 4, each of the contacts for the switches is shown to be in the set position. Thus, the set coils for each of SW1 and SW2 may be, or may have been, energized to obtain the set position for each of the switches. In order to move the contacts to the reset positions, a signal may be applied to the reset coils 68, 74 of switch SW1 and switch SW2 respectively. In accordance with embodiments of the invention, each of the SW1 and SW2 switches may be double-pole double-throw high temperature magnetic latching relays. Relays such as these may be available from Teledyne Relays of Hawthorne, Calif., possibly having series designation 422H; however, other relays may be equivalently used. Because of the latching aspect of the preferred relays, no power may be required to hold the contacts in any particular electrical configuration. Each of the effective circuits realized based on differing contact positions for switch SW1 and SW2 will now be discussed.

Figure 5A:
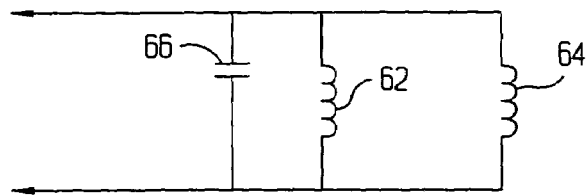
FIG. 5A illustrates an effective circuit of the system of FIG. 4 in accordance with embodiments of the invention.

FIG. 5A may illustrate the effective circuit realized with the switches illustrated in FIG. 4 in their set position. In this configuration, antenna winding 62 and antenna winding 64 may be operated in parallel with capacitor 66. In accordance with embodiments of the invention, this configuration may be used when an antenna circuit is broadcasting a two mega-Hertz electromagnetic wave. In an exemplary embodiment with each antenna winding having four turns of 28 gauge wire, capacitor 66 may comprise approximately 390 pico-Farads of capacitance to make the overall circuit resonant at approximately two mega-Hertz.

Figure 5B:
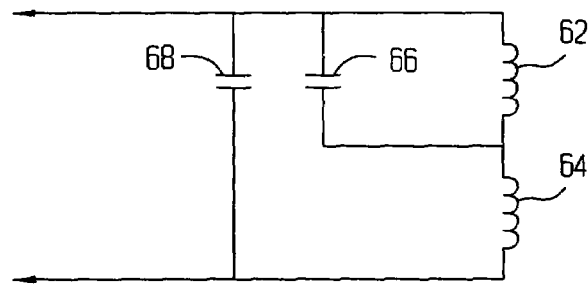
FIG. 5B illustrates an effective circuit of FIG. 4 in accordance with embodiments of the invention.

Referring again briefly to FIG. 4, consider for purposes of explanation that reset coil 74 for switch SW2 has been activated, thus moving the contacts to their second or reset position. FIG. 5B may illustrate the effective circuit realized with the SW2 contacts in the reset position, and the SW1 contact still in the set position. In this configuration, the antenna winding 62 may be in series with the antenna winding 64. The series combination of antenna winding 62 and 64 may be in parallel with capacitor 68. Capacitor 66 may be operated in parallel only with antenna winding 62. In accordance with embodiments of the invention, the circuit illustrated in FIG. 5B may be utilized when the transmitting antennas are operating at a second frequency. With inductance and capacitance for the antenna windings 62, 64 and capacitor 66 respectively the same as discussed with respect to FIG. 5A, and with capacitor 68 being approximately 2800 pico-Farads, the circuit illustrated in FIG. 5B may resonate at approximately 500 kilo-Hertz.

Figure 5C:
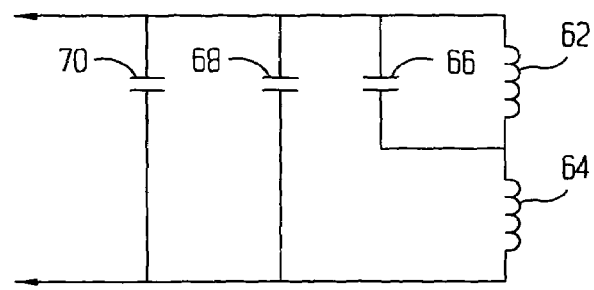
FIG. 5C illustrates an effective circuit of FIG. 4 in accordance with embodiments of the invention.

FIG. 5C may illustrate the effective electrical circuit with the contacts of both SW1 and SW2 in their reset positions (see FIG. 4). In this case, each of the parallel capacitors 68 and 70, along with capacitor 66 parallel to antenna winding 62, may be active within the circuit. The circuit illustrated in FIG. 5C may be utilized when a transmitting antennas are operating at a third frequency. With the same values for inductances and capacitances described with respect of FIGS. 5A and 5B, and with capacitor 7 being approximately 6700 pico-Farads, the circuit of FIG. 5C may resonate at approximately 250 kilo-Hertz.

Before describing how the switches are controlled in accordance with embodiments of the invention, it should be understood that the frequencies of operation described (2 mega-Hertz, 500 kilo-Hertz and 250 kilo-Hertz) are merely exemplary. Different frequencies could be used, and thus different values for the capacitances 66, 68 and 70, as well as different values for the inductances of the antenna winding 62, 64 may be used. Further, though FIG. 4 may be configured only for three resonant frequencies, the antenna circuit may be configured to become resonate at three or more desired frequencies.

Referring again to FIG. 4, upon activation of the set coil 66, the switch SW1 contact may move to its set position (illustrated by position S in the drawings). When the reset coil 68 of switch SW1 is activated, the contact may move to its reset position (indicated by the position R in the drawings). Switch SW2 may act accordingly with its set coil 72 and reset coil 74. In accordance with embodiments of the invention, however, each set coil 66 and 72 may be coupled together, and are likewise coupled to the antenna windings. Further, each reset coil 68, 74 may be coupled together, and also may be coupled to a second side of the antenna windings. In order to be operational, each set coil 66, 72 may activate at a different voltage on signal line 78 with respect to ground 76. For example, the set coil 66 of SW1 may become active, and therefore move contacts to the set position, when an applied voltage reaches a first voltage level, e.g. 5 volts DC. Preferably, the set coil 72 for SW2 becomes active at a different voltage, e.g. 12 volts DC. Likewise, with respect to the reset coil of each of switch SW1 and SW2, these coils preferably activate at different voltages on the signal line 80 with respect to the ground 76. To some extent, the voltages at which the coils activate, thus moving the contact positions, may be controller and/or modified by placing Zener diodes in series with the coils.

In accordance with embodiments of the invention, the switches SW1 and SW2 may be latching relays. Thus, DC voltages placed on the signal lines 78, 80 to activate the coils may only be momentarily applied. Thus, no battery power may be required once the switches are set (or reset). In alternative embodiments where the switches SW1 and SW2 do not have latching capability, the control voltage may need to be continuously applied.

Still referring to FIG. 4, the set coils 66 and 72 may couple to a first side of the antenna windings 62, 64. The reset coils 68 and 74 may couple to a second side of the antenna windings 62, 64. In accordance with embodiments of the invention, both the control signals for the switches SW1 and SW2, along with the signal to be applied to the antenna windings 62, 64, may propagate along the signal lines 78 and 80 together. The control voltages that activate the set and reset coils of the switches SW1 and SW2 may be DC voltages, by contrast, the signals propagating along the signal lines 78, 80 may be alternating current (AC) signals. The inventors of the current specification have found that the set and reset coils for DC activated relays may have sufficient impedance to AC signals that they act as an open circuits. Thus, the control signals and power signals to be applied to the antenna windings 62, 64 may coexist on the signal lines without detrimental interference. A blocking capacitor 81 may prevent the DC control signals from reaching the relay coils 62, 64.

Referring again to FIG. 3, in accordance with embodiments of the invention, each transmitting antenna 44, 46, 48, 50, 52 and 54 may be coupled one each to an antenna circuit 60. Various components of the antenna circuit 60, such as the switches SW1 and SW2 along with the capacitors 66, 68 and 70, may be placed proximate to the antenna windings. In particular, transmitting antenna 44 may couple to a junction box 78 in close proximity, e.g. four inches or less, to the antenna windings. This junction box may be the physical location of the switches and capacitors of the antenna circuit. In similar fashion, transmitting antenna 46 may have a junction box 80, and transmitting antenna 48 may have a junction box 82. The transmitting antennas 50, 52 and 54 may likewise each have a junction box, but these junction boxes are not illustrated so as not to unduly complicate the drawing.

As was discussed with respect to FIG. 4, the control voltages for the relays or switches SW1 and SW2 may coexist with the alternating current signals supplied to the antenna windings. Thus, both the control signals for the switches and the signal to be applied to a particular antenna winding may be coupled to a junction box, for example junction boxes 78, 80 and 82, using only two signal lines, and with the current return path possibly being the tool body. Thus, in spite of the fact that multiple control signals for relays and a signal to be broadcast need to be coupled to each antenna circuit 60, this may be accomplished using only the two signal lines. This construction is consistent with the idea that space may be at a premium within a logging tool, and the number of signal lines coupling any two devices should be minimized. Further, use of relays, in particular latching relays, may reduce the power required to perform the selective tuning over circuits where resonant circuits may be utilized. In accordance with some embodiments of the invention, the frequency firing pattern may progressively move from deep (higher frequency) to shallow (lower frequency). Thus, a single antenna may first produce an electromagnetic wave at 200 mega-Hertz, then 500 kilo-Hertz, followed by 250 kilo-Hertz. This firing pattern may reduce the number of times the relays are switched (in comparison to different frequency firing patterns), and thus may reduce power usage.

Logging tools operated in accordance with embodiments of the invention may also utilize the antenna circuit 60 to de-tune its attached antenna when not in use. By de-tuning the attached antenna (while another antenna is broadcasting), the de-tuned antenna is less likely to transmit unwanted signals caused by cross-coupling of electromagnetic signals within the tool.

The above discussion is meant to be illustrative of the principles and various embodiments of the present invention. Numerous variations and modifications will become apparent to those skilled in the art once the above disclosure is fully appreciated. For example, in some embodiments a microcontroller may be placed in each junction box, and the microcontrollers may direct the activation and deactivation of the relays. Thus, rather than carry DC voltages directed to the coils (in addition to the power signal to couple to the antenna), the two signal lines may carry communication signals directed to the microcontroller. It is intended that the following claims be interpreted to embrace all such variations and modifications.

What is claimed is:

1. A logging tool comprising:
   a tool body configured for use in a borehole;
   a receiving antenna disposed on the tool body; and
   a transmitting antenna disposed on the tool body at a spaced apart location from the receiving antenna; and
   an antenna tuning circuit comprising a relay having a coil, the coil coupled to a signal line that carries a signal applied to the transmitting antenna, wherein a control signal for the antenna tuning circuit and the signal applied to the transmitting antenna both propagate along the signal line, and wherein the antenna tuning circuit is selectively tunable to obtain a plurality of resonant frequencies.

2. The logging tool as defined in claim 1 wherein the antenna tuning circuit selectively couples capacitance to the transmitting antenna to obtain the plurality of resonant frequencies.

3. A logging tool comprising:
   a tool body configured for use in a borehole;
   a receiving antenna disposed on the tool body;
   a transmitting antenna disposed on the tool body at a spaced apart location from the receiving antenna, wherein the transmitting antenna is selectively operable at three or more resonant frequencies for transmitting electromagnetic radiation;
   an antenna tuning circuit coupled to the transmitting antenna, the antenna tuning circuit operable to selectively couple capacitance to the transmitting antenna to obtain the three or more resonant frequencies, the antenna tuning circuit further comprising:
   a relay having a coil, the coil coupled to a signal line that carries signals to the transmitting antenna;
   said relay having a set of contacts selectively coupled by activation of the coil; and
   wherein in a first contact position a capacitance is coupled to the transmitting antenna, and
   wherein in second contact position the capacitance is not coupled to the transmitting antenna.

4. The logging tool as defined in claim 3 wherein the relay couples within a junction box proximate to the transmitting antenna.

5. The logging tool as defined in claim 1 wherein the antenna tuning circuit selectively couples windings of the transmitting antenna to obtain the three of more resonant frequencies.

6. A logging tool comprising:
   a tool body configured for use in a borehole;
   a receiving antenna disposed on the tool body; and
   a transmitting antenna disposed or the tool body at a spaced apart location from the receiving antenna, wherein the transmitting antenna is selectively operable at three or more resonant frequencies for transmitting electromagnetic radiation;
   an antenna tuning circuit coupled to the transmitting antenna, the antenna tuning circuit operable to selectively couple windings of the transmitting antenna to obtain the three of more resonant frequencies, the antenna tuning circuit further comprising:
   a relay having a coil, the coil coupled to a signal line that carries signals to the transmitting antenna;
   said relay having a set of contacts selectively coupled by activation of the coil; and
   wherein in a first contact position a first set of windings of the transmitting antenna is coupled in parallel with a second set of windings of the transmitting antenna, and
   wherein in second contact position the first set of windings of the transmitting antenna is coupled in series with the second set of windings of the transmitting antenna.

7. The logging tool as defined in claim 6 wherein the relay couples within a junction box proximate to the transmitting antenna.

8. The logging tool as defied in claim 1 further comprising:
   a plurality of receiving antennas disposed in the tool body;
   a plurality of transmitting antennas disposed on the tool body; and
   wherein at least one of the plurality of transmitting antennas is selectively operable at three or more resonant frequencies.

9. The logging tool as defined in claim 8 further comprising:

three receiving antennas disposed on a medial portion of the tool body;
three transmitting antennas disposed on a first end of the tool body; and
three transmitting antennas disposed on a second end of the tool body.

10. The logging tool as defined in claim 9 wherein the tool body further comprises a tool body adapted for use within a drillstring.

11. A bottom hole assembly comprising:
a drill bit;
a logging tool coupled to the drill bit, the logging tool comprising:
   a tool body;
   a plurality of receiving antennas disposed on the tool body; and
   a plurality of transmitting antennas disposed on the tool body at a spaced apart location from each other and the receiving antennas;
   an antenna tuning circuit comprising a relay having a coil, the coil coupled to and configured to receive a control signal from a signal line that carries signals to a first transmitting antenna, wherein the antenna tuning circuit is selectively tunable to obtain a plurality of resonant frequencies.

12. The logging tool as defined in claim 11 further comprising a plurality of antenna tuning circuits coupled one each to the plurality of transmitting antennas, each antenna tuning circuit each selectively couples capacitance to its respective transmitting antenna to achieve a plurality of resonant frequencies.

13. A bottom hole assembly comprising:
a drill bit;
a logging tool coupled to the drill bit, the logging tool comprising:
   a tool body;
   a plurality of receiving antennas disposed on the tool body; and
   a plurality of transmitting antennas disposed on the tool body at a spaced apart location from each other and the receiving antennas;
   wherein each transmitting :antenna is selectively operable at greater than two resonant frequencies for transmitting electromagnetic radiation;
a plurality of antenna tuning circuits coupled one each to the plurality of transmitting antennas, each antenna tuning circuit each selectively couples capacitance to its respective transmitting antenna to achieve the greater than two resonant frequencies, wherein each antenna tuning circuit further comprises:
   a relay having a coil, the coil coupled to a signal line that carries signals to a transmitting antenna;
   said relay having a set of contacts selectively coupled by activation of the coil; and
   wherein in a first contact position a capacitance is coupled to the transmitting antenna, and
   wherein in second contact position the capacitance is not coupled to the transmitting antenna.

14. The logging tool as defined in claim 13 wherein the relay couples within a junction box proximate to its respective transmitting antenna.

15. The logging tool as defined in claim 11 further comprising a plurality of antenna tuning circuits coupled one each to the transmitting antennas, each antenna tuning circuit operable to selectively coupe windings of a transmitting antenna to achieve the plurality of resonant frequencies.

16. A bottom hole assembly comprising:
a drill bit;
a logging tool coupled to the drill bit, the logging tool comprising:
   a tool body;
   a plurality of receiving antennas disposed on the tool body; and
   a plurality of transmitting antennas disposed on the tool body at a spaced apart location from each other and the receiving antennas, wherein each transmitting antenna is selectively operable at greater than two resonant frequencies for transmitting electromagnetic radiation;
a plurality of antenna tuning circuits coupled one each to the transmitting antennas, each antenna tuning circuit operable to selectively couple windings of a transmitting antenna to achieve the greater than two resonant frequencies, wherein each antenna tuning circuit further comprises:
   a relay having a coil, the coil coupled to a signal line that carries signals to a transmitting antenna,
   said relay having a set of contacts selectively coupled by activation of the coil; and
   wherein in a first contact position a first set of windings of the transmitting antenna is coupled in parallel with a second set of windings of the transmitting antenna, and
   wherein in second contact position the first set of windings of the transmitting antenna is coupled in series with the second set of windings of the transmitting antenna.

17. The logging tool as defined in claim 16 wherein the relay couples within a junction box proximate to its respective transmitting antenna.

* * * * *